3,185,141
VARIABLE RATE SPRING DEVICES
Zdislav Stanislav Miracki and Anthony Lindsay, London, England, assignors to Simms Motor Units Limited, London, England, a British company
Filed Jan. 28, 1964, Ser. No. 340,658
Claims priority, application Great Britain, Jan. 29, 1963, 40,827/63
3 Claims. (Cl. 123—140)

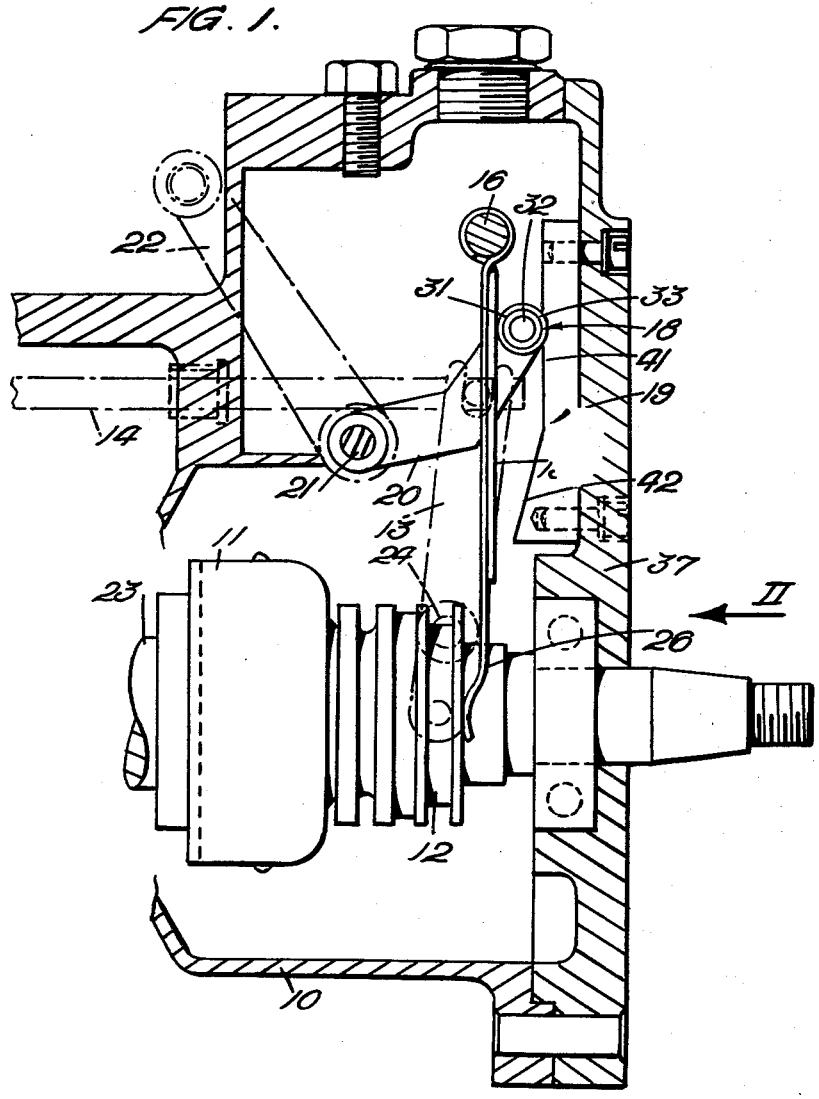

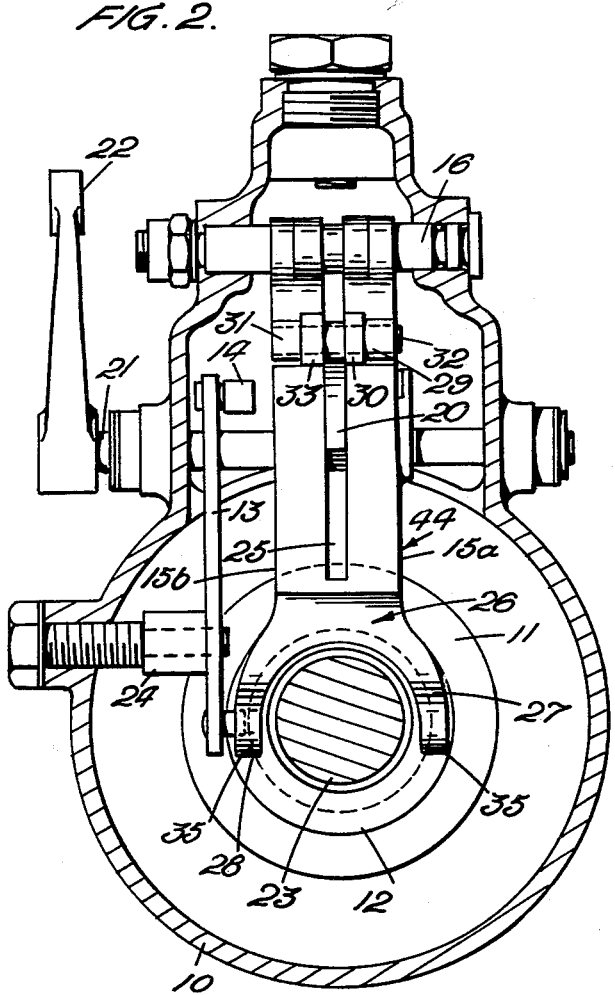

The invention relates to variable rate spring devices.

The invention provides a variable rate spring device comprising a longitudinal leaf spring or the like arranged to exert a resilient thrust at a thrust position along its length in a direction transversely of its length; fixing means for fixing the spring at a fixing position, spaced apart along its length from the said thrust position, against movement at least in the said transverse direction; and loading means for exerting a loading thrust on the spring in the said transverse direction at a loading position which is variable along the length of the spring, whereby variation of the loading position along the length of the spring causes variation of the rate of change of thrust at the said thrust position with change of deformation of the spring in the said transverse direction at that position.

Preferably the fixing means comprises a pivot for the spring which constrains the spring to rotate about an axis which passes through the fixing position and is perpendicular to both the length of the spring and the said transverse direction.

Preferably the loading position is intermediate the thrust position and the fixing position. Preferably means is provided to automatically vary the said loading thrust with variation of the loading position along the length of the spring as aforesaid. Preferably the loading means comprises a track in a fixed position alongside at least part of the spring and spaced away transversely therefrom, and a bearing member interposed between the track and the spring and movable along the track to vary the loading position as aforesaid. Preferably the spacing in the said transverse direction of the track from the spring varies along at least part of the length of the spring, whereby movement of the bearing member along that part of the length to vary the loading position as aforesaid also automatically varies the loading thrust exerted by the bearing member on the spring as aforesaid. Preferably the variation of the said spacing is different along different parts of the length of the spring.

Preferably the spring comprises two longitudinally extending spring parts spaced apart transversely of the said transverse direction, and there is provided means for varying the loading position as aforesaid which means includes an arm member extending through the space between the two spring parts. Preferably the track comprises two track members positioned respectively opposite the two spring parts, and the bearing member comprises two rollers, respectively interposed between one of the track members and the respective spring member.

The invention includes a spring governor device incorporating a variable rate spring device as aforesaid.

A specific embodiment of the invention will now be described by way of example and with reference to the accompanying drawings, in which:

FIGURE 1 is a longitudinal section through the spring governor device of a diesel fuel injection pump, and FIGURE 2 is an end view of the device shown in FIGURE 1, in the direction of the arrow II and with the end plate of the device removed.

The fuel injector pump (not shown) has a casing 10 and a cam shaft 23 which is rotatable to drive the injector pump. A centrifugal governor 11 is mounted on the cam shaft 23 for rotation therewith and carries a thrust ring 12 which is slidable longitudinally of the cam shaft. The thrust ring is connected, by means of a lever 13 pivoted about a shaft 24, to the control rod 14 of the injector pump. The arrangement is such that the longitudinal position of the thrust ring 12 with respect to the cam shaft 23 determines the longitudinal position of the control rod 14. The longitudinal position of the control rod determines the quantity of fuel delivered at each stroke by the injector pump to the diesel engine. The thrust ring 12 is urged towards the right (as viewed in FIGURE 1) by means of the centrifugal governor 11 with a force which depends upon the cam shaft speed, and is urged towards the left (as viewed in FIGURE 1) by means of a spring 15. The spring 15 comprises a longitudinal leaf spring arranged to exert a resilient thrust on the thrust ring 12 at a thrust position 35, in the direction leftwardly (as viewed in FIGURE 1). The resilient thrust exerted by the spring is transverse to the length of the spring and this resilient thrust has a component along the axis of the camshaft. Fixing means for fixing the spring at its upper end against movement in this transverse direction comprises a pin 16 around which the upper end of the spring is wrapped. The spring can pivot about the pin 16 but is fixed at that position against movement in the said transverse direction. In this example the spring 15 comprises two separate but adjacent leaves 26 and 44, the leaf 44 extending only part of the way along the leaf 26. The shorter leaf 44 is on the side of the longer leaf 26 remote from the thrust ring 12. A longitudinal slot 25 through both leaves has a length rather shorter than the shorter leaf 44 and divides that part of the length of the spring into two parallel parts 15a and 15b. The lower end of the leaf 26, below the bottom of the shorter leaf 44, is bifurcated in the form of a fork having two arms 27, 28 which are bent transversely of the length of the spring towards the thrust pad 12 to provide small areas of contact with it at the thrust position 35.

Loading means are provided for exerting a loading thrust on the spring in a direction parallel to the said transverse direction. The loading means includes a bearing member 18 which consists of four rollers 31, 33, 30, 29 mounted on a shaft 32. The two axially outermost rollers 31 and 29 are of smaller diameter and are spaced apart by the two axially inner rollers 33 and 30, which are in turn spaced axially away from each other and are of larger diameter than the outer rollers 31 and 29. All four rollers have their radially outermost and innermost surfaces provided by nylon material to reduce friction. The loading means also includes a track 19 fixed to the end cap 37 of the governor casing and comprising two track members positioned respectively opposite the two parallel spring parts 15a, 15b. The bearing member 18 is interposed between the track 19 and the spring 15, in such a way that the two large diameter inner rollers 33, 30 abut against the shorter leaf 44 at the spring parts 15a and 15b respectively, and the two smaller diameter outer rollers 29 and 31 abut against the two track members respectively. Means for moving the bearing member along the track to vary the loading position along the length of the spring include an arm 20 which has in one end a longitudinal slot. In this slot is journaled the middle of the shaft 32 between the two inner rollers 33 and 30. The arm 20 extends through the slot 25 between the spring parts and is secured to a shaft 21 journaled in the casing 10. A further arm 22 is also secured to the shaft 21 outside the governor casing. When the injector pump and governor arrangement is installed in, for example, a motor vehicle, the arm 22 is connected to a control in the driver's cabin so that the position of the bearing member 18 along the spring may be adjusted at will to vary the loading position along the spring.

Furthermore, the arrangement is such that the loading thrust on the spring provided by the bearing member 18 is automatically varied as the loading position moves along part of the length of the spring. To this end, the lowermost part 42 of the face of the track 19 against which the rollers 29, 31 engage slopes towards the spring 15 as the track extends downwardly towards the cam shaft 23. Thus as the bearing member 18 is moved by the arm 20 downwardly (as viewed in FIGURE 1) along the lowermost part 42 of the track 19, the bearing member is constrained by the inclined part 42 of the track to move progressively along the said transverse direction parallel to the axis of the cam shaft and towards the spring and thus to progressively increase the loading thrust exerted on the spring by the bearing member. The uppermost part 41 of the track 19 is not so inclined but is substantially parallel to the position occupied by the spring shown in FIGURE 1.

The rate of change of thrust exerted on the thrust ring 12 by the spring at the thrust position 35 at its ends 27, 28 with deformation of that end of the spring along the transverse direction depends both upon the position along the length of the spring at which the bearing member 18 applies a loading thrust to the spring and also with the amount of that loading thrust applied by the bearing member. Both these latter variables are controlled by the position of the arm 22. Consequently the position of the arm 22 controls the variation of the thrust applied to the thrust ring 12 by the spring with the position of the thrust pad along the cam shaft 23, thus controlling the position to which the control rod 14 is set by the governor arrangement in response to any particular cam shaft speed and also the rate of variation of position of the control rod with rate change of cam shaft speed. In other words, the variation of the governed amount of fuel supplied to the engine by the injector pump with the cam shaft speed can be controlled by adjusting the setting of the arm 22. The characteristics of this variation may be adjusted by adjusting, for example, the angle of inclination of the bearing face of the track 19 with respect to the line between the pivotal axis of the spring about pin 16 and the position of the thrust position 35 along the cam shaft axis at any given governor speed. In this particular example, the inclination of the upper part 41 of the track is chosen to give a governor characteristic appropriate to idling of the engine which it controls, and the inclination of the lower inclined part 42 of the track is chosen to give a governor characteristic appropriate to working under load of the engine.

The invention is not restricted to the details of the foregoing example. For instance, the profile of the track 19 may be of any desired shape, e.g. curved, to give required governor characteristics.

We claim:

1. In or for a fuel injector pump having a casing and a cam shaft which is rotatable to drive the injector pump, a centrifugal governor mounted on the cam shaft for rotation therewith and carrying a thrust ring which is slidable longitudinally of the cam shaft, the thrust ring being connected, by means of a lever pivoted about a first shaft, to the control rod of the injector pump, the arrangement being such that the longitudinal position of the thrust ring with respect to the cam shaft determines the longitudinal position of the control rod, and the longitudinal position of the control rod determines the quantity of fuel delivered at each stroke by the injector pump, the thrust ring being urged in one direction along the cam shaft by means of the centrifugal governor with a force which depends upon the cam shaft speed, and being urged in the opposite direction along the cam shaft by means of a spring; the spring comprising a longitudinal leaf spring arranged to exert a resilient thrust on the thrust ring at a thrust position near its lower end, in the said opposite direction, the resilient thrust exerted by the spring being transverse to the length of the spring and having a component along the axis of the cam shaft in the said opposite direction; fixing means for fixing the spring at its upper end against movement in this transverse direction comprising a pin around which the upper end of the spring is wrapped, so that the spring can pivot about the pin but is fixed at that position against movement in the said transverse direction; the spring comprising two separate but adjacent leaves the shorter leaf extending only part of the way along the longer leaf, the said shorter leaf being on the side of the longer leaf remote from the thrust ring, the spring being formed with a longitudinal slot through both leaves which slot has a length rather shorter than the shorter leaf and divides that part of the length of the spring into two parallel parts, the lower end of the longer leaf, below the bottom of the shorter leaf being bifurcated in the form of a fork having two arms which are bent transversely of the length of the spring towards the thrust pad to provide small areas of contact with it at the thrust position; loading means for exerting a loading thrust on the spring in a direction parallel to the said transverse direction, the loading means including a bearing member which consists of four rollers mounted on a second shaft, the two axially outermost rollers being of smaller diameter and spaced apart by the two axially inner rollers which are in turn spaced axially away from each other and are of larger diameter than the outer rollers, all four rollers having their radially outermost and innermost surfaces provided by nylon material to reduce friction; the loading means also including a track fixed to an end cap of the governor casing and comprising two track members positioned respectively opposite the two parallel spring parts, the bearing member being interposed between the track and the spring, in such a way that the two large diameter inner rollers abut against the shorter leaf at the two parallel spring parts respectively, and the two smaller diameter outer rollers abut against the two track members respectively; means for moving the bearing member along the track to vary the loading position along the length of the spring including a first arm into one end of which is journaled the middle of the second shaft between the two inner rollers, the arm extending through the slot between the spring parts and is secured to a third shaft journaled in the casing; a second arm also being secured to the second shaft outside the governor casing, the second arm being connected to a control in the driver's cabin of a motor vehicle in which the injector pump is installed so that the position of the bearing member along the spring may be adjusted at will to vary the loading position along the spring; the arrangement being such that the loading thrust on the spring provided by the bearing member is automatically varied as the loading position moves along part of the length of the spring, to this end, the lowermost part of the face of the track against which the outer rollers engage being formed sloping towards the spring as the track extends downwardly towards the cam shaft, so that as the bearing member is moved by the arm downwardly along the lowermost part of the track, the bearing member is constrained by the inclined lowermost part of the track to move progressively along the said opposite direction parallel to the axis of the cam shaft and towards the spring and thus to progressively increase the loading thrust exerted on the spring by the bearing member, the uppermost part of the track not being so inclined but being substantially parallel to the position occupied by the spring; the rate of change of thrust exerted on the thrust ring by the spring at the thrust position near its lower end, with deformation of that end of the spring along the transverse direction depending both upon the position along the length of the spring at which the bearing member applies a loading thrust to the spring and also with the amount of that loading thrust applied by the bearing member, both these latter variables are controlled by the position of the second arm, so that the position of the second arm controls the variation of the thrust applied to the thrust ring by the spring with the position of the thrust pad along the cam shaft, thus controlling the position to which the control rod is set by the governor arrangement in response to any particular cam shaft speed and also the rate of variation of position of the control rod with rate change of cam shaft speed, in other words, the variation of the governed amount of fuel supplied to the engine by the injector pump with the cam shaft speed being controlled by adjusting the setting of the second arm 22, the characteristics of this variation being capable of adjustment by adjusting, for example, the angle of inclination of the bearing face of the track with respect to the line between the pivotal axis of the spring about the pin and the position of the thrust position along the cam shaft axis at any given governor speed, and the inclination of the upper part of the track being chosen to give a governor characteristic appropriate to idling of the engine which it controls, and the inclination of the lower inclined part of the track being chosen to give a governor characteristic appropriate to working under load of the engine.

2. A variable rate spring device comprising a longitudinal leaf spring arranged to exert a resilient thrust at a thrust position along its length in a direction transversely of its length; fixing means for fixing the spring at a fixing position, spaced apart along its length from the said thrust position, against movement at least in the said transverse direction; and loading means for exerting a loading thrust on the spring in the said transverse direction at a loading position which is variable along the length of the spring, whereby variation of the loading position along the length of the spring causes variation of the rate of change of thrust at the said thrust position with change of deformation of the spring in the said transverse direction at that position; which spring comprises two longitudinally extending spring parts spaced apart transversely of the said transverse direction; and there is provided means for varying the loading position as aforesaid which means includes an arm member extending through the space between the two spring parts.

3. A variable rate spring device comprising a longitudinal leaf spring arranged to exert a resilient thrust at a thrust position along its length in a direction transversely of its length; fixing means for fixing the spring at a fixing position, spaced apart along its length from the said thrust position, against movement at least in the said transverse direction; and loading means for exerting a loading thrust on the spring in the said transverse direction at a loading position which is variable along the length of the spring, whereby variation of the loading position along the length of the spring causes variation of the rate of change of thrust at the said thrust position with change of deformation of the spring in the said transverse direction at that position; which loading means comprises a track in a fixed position alongside at least part of the spring and spaced away transversely therefrom, and a bearing member interposed between the track and the spring and movable along the track to vary the loading position as aforesaid; and which spring comprises two longitudinally extending spring parts spaced apart transversely of the said transverse direction; and including means for varying the loading position as aforesaid which means includes an arm member extending through the space between the two spring parts; and which track comprises two track members positioned respectively opposite the two spring parts, and the bearing member comprises two rollers, respectively interposed between one of the track members and the respective spring member.

References Cited by the Examiner
UNITED STATES PATENTS

| | | | |
|---|---|---|---|
| 1,324,198 | 12/19 | Krebs et al. | 73—543 |
| 2,267,919 | 12/41 | Hoof | 73—540 |
| 2,507,689 | 5/50 | Buck et al. | 123—140 |
| 2,947,299 | 8/60 | Shallenberg et al. | 123—140 |

RICHARD B. WILKINSON, *Primary Examiner.*